United States Patent Office 3,666,647
Patented May 30, 1972

---

3,666,647
SEPARATION OF FRUCTOSE AND GLUCOSE
Tetsujiro Kubo, 783 Seijo-machi, Setagaya-ku, Tokyo, Japan, and Ryoki Tatuki, 16 Aza Tera-machi, Goshoga-wara-shi, Aomori-ken, Japan
No Drawing. Filed Feb. 5, 1970, Ser. No. 9,079
Claims priority, application Japan, Feb. 17, 1969, 44/11,053; Aug. 26, 1969, 44/66,880; Dec. 20, 1969, 44/102,095
Int. Cl. B01d *13/02*
U.S. Cl. 204—180 P    6 Claims

ABSTRACT OF THE DISCLOSURE

Fructose can be recovered from a sugar solution containing fructose and glucose, such as an invert sugar solution or an isomerized sugar solution, in the form of a calcium chloride double salt thereof, and then the fructose can be separated from the double salt by passing an aqueous solution of the double salt through an electrodialysing device having an ion exchange membrane, the sugar solution containing the fructose and the glucose being used as the condensing liquor.

BACKGROUND OF THE INVENTION

(1) Field of the invention

The present invention relates to a method for separating fructose from sugar solution containing fructose mixed with glucose and, more particularly, it relates to a method for producing fructose of high purity by separating fructose from the invert sugar solution of sugar, or from the isomerized sugar solution obtained by isomerizing glucose of sugar, or from the isomerized sugar solution obtained by isomerizing glucose.

(2) Description of the prior art

As suitable methods for producing fructose, there have been proposed such methods as one which requires the extracting fructose from the natural raw material containing it fructose, or another according to which the fructose is separated from the invert sugar solution obtained by inverting sugar with acid, or from the isomerized sugar solution obtained by isomerizing glucose with alkali or enzyme. However, these above-mentioned methods, although conventional, cannot be said to be sufficiently advantageous from an industrial point of view.

With respect to the problem of separating fructose by conventional methods, the methods of separating fructose in the form of fructose lime, or of converting the glucose contained in the mixed sugar solution into gluconic acid to separate the same in the form of its sodium salt, or of preparing the alcohol solution of a highly concentrated mixed sugar solution and adding the thus obtained solution to calcium chloride to separate the fructose in the form of a calcium chloride double salt, have all been utilized. However, when the above-mentioned conventional methods are used, no industrially satisfactory result can be obtained because of the low yields and of the high costs of production.

In particular, the above cited method for separating fructose from an alcohol solution in the form of a calcium chloride double salt, described in U.S. Pat. 3,533,839, has been reported to have a maximum yield of fructose calcium chloride double salt only when the concentration of alcohol is 85%. It is, however, necessary to use a large amount of alcohol, large equipment for recoving the used alcohol, and to keep the concentration of the alcohol constant in view of the separation of the fructose. Consequently, this conventional method becomes disadvantageous from the stand point of economy and plant operation.

Furthermore, in accordance with the above-mentioned conventional method in which an alcohol solution is used, the separation of the fructose from the fructose calcium chloride double salt by adding a precipitant for producing the insoluble salt of calcium, such as a carbonate, a sulfate, or an oxalate, and by desalting the solution by means of ion exchange resins or dialytic membranes or by means of electrodialysis by using an ion exchange membrane was already proposed. However, since the amount of calcium chloride contained in solution is relatively large, a method employing an ion exchange resin or a dialytic membrane is not economically advantageous, and if a precipitant is utilized, there is a drawback in the large loss of fructose. Consequently, as a practical matter, electrodialysis and ion exchange membranes are used in combination.

However, in accordance with the conventional electrodialysis method in which water is used as the condensation liquid, from 1 to 6% of the fructose is removed to the condensation aqueous liquid along with calcium chloride and it becomes impractical to recover calcium chloride and fructose, thus increasing the cost of production and lowering the yield of fructose obtained.

SUMMARY OF THE INVENTION

By the present invention we have found that if the mixture prepared by adding calcium chloride to the sugar solution containing already fructose and glucose is condensed, and then is slowly cooled under mild agitation, the fructose calcium double salt may be advantageously separated without addition of alcohol.

In addition, we have discovered that, when electrodialysis is applied by using an ion exchange membrane in separating fructose from the fructose calcium chloride double salt, if the raw material sugar solution containing fructose and glucose is used as the condensation liquid, fructose may be separated with a remarkably high yield.

Therefore, the main object of the present invention is to provide a novel method for recovering fructose of high purity and in high yields by separating fructose from the sugar solution containing glucose and fructose, such as invert sugar solutions or isomerized sugar solutions.

DESCRIPTION OF THE PREFERRED EMBODIMENTS

As the starting material suitable for the method of the present invention, a sugar solution containing fructose and another sugar, such as glucose, or the invert sugar solution or isomerized sugar solution of glucose may be used.

In adding calcium chloride to the sugar solution containing fructose and glucose, it is necessary to adjust the raw material sugar solution, containing fructose and glucose, so as to render it neutral or acidic.

In practice, calcium chloride is added by adjusting the pH value of the sugar solution in the range of 7 to 2.

It is possible to add the calcium chloride directly to the sugar solution, but it is preferable to add it in the form of an aqueous solution or emulsion, so as to prevent a rise in the temperature of the sugar solution.

When calcium chloride is added, if the temperature of the sugar solution is raised above 70° C., the purity of the fructose calcium double salt separated is deteriorated, and, therefore, careful attention should be paid to the addition step.

As to the amount of calcium chloride to be added, this should be above 15%, based on the total weight of the sugars contained in the raw material sugar solution.

The sugar solution, with the calcium chloride dissolved therein, is then condensed such as by means of vacuum distillation.

As to the concentration of the mixed sugar solution, this should be continued until a point approximating Brix 77 can be attained.

Thereafter, the condensed sugar solution is cooled off while slowly stirring the same. In about 90 to 120 minutes fructose calcium chloride double salt begins to crystallize out and in about 10 hours the crystallization is practically terminated.

Upon completion of the crystallization, a fructose calcium chloride double salt of high purity is obtained through conventional filtration or centrifugal separation.

The solution, which was prepared by dissolving the fructose calcium chloride double salt into water, is then used as the mother liquor, while the raw material sugar solution containing admixed fructose and other sugars is used as the condensing liquor. These two solutions or liquors are introduced into the electrodialysis apparatus to separate the fructose.

An apparatus for carrying out the electrodialysis, those including an ion exchange membrane may be suitably used. Yet, it is necessary to use the raw material sugar solution in place of water on the side of the condensing liquor.

In carrying out the electrodialysis, when the raw material sugar solution is used as the condensing liquor, it is possible to reuse the sugar solution containing from 1 to 6% of fructose moved to the side of the condensing liquor along with calcium chloride, as the raw material for producing fructose calcium chloride double salt. Consequently, a loss of calcium chloride and fructose may be prevented, and as a result, the yield of the fructose may be greatly improved, and the production costs of fructose may be lowered.

In addition, in carrying out the electrodialysis, when the raw material sugar solution is used as the condensing liquor, the operation is fully trouble-free and, because of the desalting efficiency, desalting speed, and operation time, a great improvement may be observed over any of the conventional methods which use water as the condensing liquor.

The fructose solution is obtained by carrying out the electrodialysis, the amount of calcium chloride contained therein is reduced by $\frac{1}{200}$ to $\frac{1}{300}$, thus when passed through the ion exchange resin, being perfectly and advantageously desalted. On the other hand, the amount of the ion exchange resin employed is little and, therefore, the adsorption of fructose on to the resin as well as the loss of ion exchange resin, and the cost required for the rejuvenation of the resin can also be substantially lowered.

After having condensed the high purity fructose obtained as mentioned above, this is slowly cooled while slowly stirring the same, and crystals of fructose are recovered.

The crystals of fructose are separated in accordance with conventional methods and are dried.

In addition to the above, the present invention provides for the glucose to be dissolved into the residue obtained by the separation of fructose calcium chloride double salt from, for example, the sugar solution in which fructose and glucose are mixed, and for the fructose produced in said sugar solution to be made into a double salt by using the calcium chloride dissolved in the sugar solution (said calcium chloride remains in the residue after the separation of fructose calcium chloride double salt prepared by adding calcium chloride to the raw material sugar solution in the beginning of the process) or by adding calcium chloride. Thereafter, the fructose described above, and the glucose separated from the residual solution is isomerized. The operation is then repeated.

In the above-mentioned embodiment, in carrying out the isomerization of the glucose dissolved in the residual solution obtained after having separated the fructose calcium chloride, a conventional alkali process or an enzyme process may be adopted. However, when isomerization is carried out by using calcium hydroxide, calcium chloride is produced by neutralizing with hydrochloric acid after isomerization, so that it is not necessary to supply calcium chloride for producing the fructose calcium chloride double salt, which should be considered an advantage.

When the isomerization is carried out by using an enzyme such as glucose-isomerase, the glucose isolated from the residual solution by the process described below is isomerized.

In accordance with this embodiment of the present invention, calcium chloride is added to the raw material sugar solution as mentioned above, and the fructose calcium chloride double salt is precipitated and separated from the residual liquid while the glucose contained in the thus obtained residual liquid can be recovered by subjecting the raw material sugar solution, as the condensing liquor, to electrodialysis.

A considerable amount of calcium chloride is contained in said residual solution in addition to glucose and, therefore, when the glucose is desired to be recovered from the residual solution, it is economically disadvantageous to adopt the conventional ion exchange resin or electrodialysis.

Therefore, in such a case, it is possible to separate the glucose and to recover the calcium chloride in the raw material sugar solution by using the raw material sugar solution in place of water as the condensing liquor solution, in the same manner as in the separation of fructose from fructose calcium chloride double salt.

The glucose recovered in such a manner as described above, can be used as the raw material sugar solution by isomerizing the same with an enzyme, although the sugar solution containing $CaCl_2$ may also be used by circulating the same as the raw material sugar solution for recovering the fructose.

The following are typical examples to further illustrate the present invention. It should be stated, however, that it is possible to adopt variations and modifications thereof without departing from the spirit of the present invention, so that this invention should not be considered limited by the given examples.

EXAMPLE 1

(a) 1 kg. of refined white sugar was dissolved into 80° C. water in such a manner that the concentration of the solution became Brix 40. After the temperature of the solution was lowered to 69° C., 5.8 g. of hydrochloric acid were added thereto and the solution was sufficiently stirred. While keeping the temperature of the solution at 70° C., after 90 minutes, 2.9 g. of calcium carbonate were added to neutralize the solution.

(b) The invert sugar solution obtained was kept at from 62 to 67° C., and 25 g. of calcium chloride were slowly dissolved therein while stirring. The solution was then allowed to stand for 60 minutes and then it was concentrated by using a vacuum concentrator. When the concentration of the solution was Brix 82, it was transferred into a vessel which was slowly rotated, and then it was cooled to room temperature (26° C.).

In 12 hours, molasses containing a great amount of white crystals of fructose calcium chloride double salt were obtained.

The molasses were charged to a basket-type centrifugal separator and the crystalline portion (690 g. with 3.2% water) was separated from the molasses portion (825 g.).

(c) 140 cc. of hot water (70° C.) were added to the 690 g. of crystals obtained and these were dissolved while stirring. The solution then was transferred to a vessel which was slowly rotated, and in about 8 hours recrystallization was terminated.

The obtained product was charged to a centrifugal separator, and was separated into a 425 g. portion of white crystals and a 402 g. portion of molasses.

An analysis of the crystalline portion gave the results shown in Table I.

TABLE I

| | Crystalline water | Fructose | Calcium chloride | Others (water, etc.) |
|---|---|---|---|---|
| Weight ratio | 6.4 | 72.0 | 19.7 | 1.9 |
| Molar ratio | 3.56 | 4.0 | 1.78 | |
| Estimated integer ratio | 2 | 2 | 1 | |

From the above tabulated values, the composition of the fructose calcium chloride was calculated to be

(fructose).

(d) 402 g. of the above-mentioned portion were condensed to Brix 82, and 161 g. of white crystals and 148 g. of molasses were obtained in the same manner as in (b).

EXAMPLE 2

500 g. of the white crystalline portion obtained in Example 1 (c) and (d) were dissolved in water and the volume of the aqueous solution was adjusted to 1.65 liters. The obtained solution was used as sample mother liquor.

The obtained sugar solution was passed into a Du-Cb type complete set (the effective surface area being 209 cm.² per chamber manufactured by Nippon Rensui K.K.) by using an ion exchange membrane (CMT/AMV 11 pairs, ceremion) at the rate of 100 liters per hour (the membrane-surface linear velocity being 1.28 cm./sec.) and 2.0 liters of invert sugar solution with concentration adjusted at Brix 20 was passed through the side of the condensing liquor at the rate of 100 liters/hours.

The results of the test are given in the following Table II.

TABLE II

| | Mother liquor side | | Condensing liquor side | |
|---|---|---|---|---|
| | Primary stage | Final stage | Primary stage | Final stage |
| Liquid amount (liters) | 1.60 | 1.45 | 2.0 | 2.1 |
| Concentration of calcium (p.p.m. as $CaCO_3$) | 53.700 | 180 | | 40.100 |
| Total cation (p.p.m. as $CaCO_3$) | 61.700 | 185 | 240 | 45.800 |
| Total anion (p.p.m. as $CaCO_3$) | 61.850 | 180 | 220 | 45.810 |
| Time for conduction | | 3.25 hours | | |
| Amount of conduction | | 5.95 AH | | |
| Voltage | | 15.0 v. constant | | |

The loss of fructose in this case was about 3.2%, but it was found that the fructose equalled closely the amount transferred to the side of the condensing liquor. On the other hand, almost the entire amount of calcium chloride was also transferred to the side of the condensing liquor.

The above table shows that there is basically no difference from the result of the comparative test carried out by using water as the condensing liquor, results given in the following Table III.

TABLE III

| | Mother liquor side | | Condensing liquor side | |
|---|---|---|---|---|
| | Primary stage | Final stage | Primary stage | Final stage |
| Amount of liquid (liters) | 1.60 | 1.40 | 2.00 | 2.18 |
| Concentration of calcium as $CaCO_3$, p.p.m. | 53.600 | 175 | | 39.300 |
| Total cation (as $CaCO_3$, p.p.m.) | 61.650 | 180 | | 45.200 |
| Total anion (as $CaCO_3$, p.p.m.) | 61.780 | 170 | | 45.220 |
| Time for conduction | | 3.25 hours | | |
| Amount of conduction | | 5.93 AH | | |
| Voltage | | 15.0 v. constant | | |

The loss of fructose in the mother liquor was 3.8%.

(a) 1.45 liters of sugar solution obtained as mentioned above, was passed through a mixed bed type ion exchange resin column, and the refining and desalting were carried out.

As the ion exchange resin, a hydrogen-type, strongly acidic, cation exchange resin, such as Amberlite IR–120B, and a hydroxyl radical-type, strongly basic, anion exchange resin, suc has Amberlite IRA–4ID were used.

(b) The refined fructose solution obtained was subjected to vacuum condensation, and the concentration of the solution was adjusted to a value of Brix 89, and about 5 g. of crystalline fructose were added thereto. The solution was then slowly cooled while stirring slowly, and in about 15 hours the crystallization was terminated. Then, the product obtained was subjected to centrifugal separation and dried.

241 g. of crystalline fructose and 143 g. of a molasses portion were obtained.

(c) 143 g. of the above-mentioned molasses portion were subjected to vacuum concentration, the concentration being adjusted to Brix 89. About 2 g. of crystalline fructose were added to the concentrated mass and 84 g. of crystalline fructose and 76 g. of molasses portion were obtained in the same manner as before.

The result of the measurements carried out on the crystalline fructose obtained in the above (b) and (c) operations is given herebelow:

(1) Specific rotary power $[\alpha]_D^{20} = -92.8$ — (b) the first sugar $= -92.6$ — (c) the second sugar (2) In accordance with resorcin Hydrochloric acid method, 99.4%, (b); the amount of fructose was, 99.1% (c); respectively.

EXAMPLE 3

(a) 100 kg. of refined white sugar were dissolved into 80° C. water in such a manner that concentration of the solution became Brix 40, and when the temperature of the solution was lowered to 69° C., 577 g. of hydrochloric acid were added thereto and the mixture was sufficiently stirred, while keeping the temperature at 70° C. After 90 minutes, 293 g. of calcium carbonate were added to neutralize the solution.

(b) 25 kg. of calcium chloride were slowly added to the invert sugar solution obtained as mentioned above, and, while stirring, this was allowed to stand for about 60 minutes.

The temperature of the solution at this time ranged from 72° C. to 67° C.

The solution obtained above was transferred to a polyethylene bucket vessel after concentration by using a vacuum concentrator till the concentration of the solution was Brix 82. It was left in the vessel at room temperature (26° C.) and then it was slowly cooled.

In about 12 hours, molasses containing a large amount of white crystals of fructose calcium chloride were obtained.

The molasses were then separated by means of a basket-type centrifugal separator into a crystalline portion and a molasses portion, and the amount of the crystalline portion was 65.1 kg. (containing 3.2% of water) while the amount of the molasses portion was 82.2 kg.

(c) Water was added to 82.2 kg. of the molasses portion obtained above and the concentration thereof was adjusted to Brix 60. Then 2.5 kg. of calcium hydroxide were added to the solution while stirring. Thereafter the mixture was heated to a temperature from 93 to 95° C. through a plate heat exchanger, and was kept at the same temperature for 10 minutes. Thereafter, it was cooled quickly to 15° C. through the same heat exchanger and hydrochloric acid was added thereto to adjust the pH value thereof to 5.8.

(d) The solution obtained was diluted with water to adjust the concentration to Brix 30, and then was passed through an activated carbon layer to remove the color, and 65.1 kg. of fructose calcium chloride were dissolved therein. The solution obtained was then subjected to vacuum concentration to adjust the concentration thereof to Brix 81.5, and then it was allowed to slowly cool while standing. In about 8 hours, molasses containing a large amount of crystals were obtained.

The molasses were subjected to centrifugal separation until 79.2 kg. of a crystalline portion and 63.9 kg. of a molasses portion could be obtained.

(e) 15 liters of water (70° C.) were added to 79.2 kg. of the above crystalline portion, and the mixture was stirred to fully dissolve the crystalline portion. The obtained solution was slowly cooled on standing and in about 8 hours recrystallization was terminated.

The product obtained was subjected to a centrifugal separation, and 71.1 kg. of a white crystalline portion and 22.5 kg. of a filtrate were obtained.

The analysis of the crystalline portion gave the results shown in the following Table IV.

TABLE IV

|  | Crystalline water | Fructose | Calcium chloride |
|---|---|---|---|
| Weight ratio | 6.4 | 72.0 | 19.7 |
| Molar ratio | 3.56 | 4.0 | 1.78 |
| Estimated integer ratio | 2 | 2 | 1 |

From the above results, the composition of fructose calcium chloride was calculated to be $2H_2O$—$CaCl_2$—2 fructose.

(f) 3 kg. of the white crystals were taken from the 71.1 kg. obtained and dissolved in water. The volume was adjusted to 10 liters and then passed through an activated carbon layer. Desalting was carried out by using an apparatus with ion exchange membrane-electrodialysis (manufactured by Nippon Rensui K. K.; Model Du-Ob; the membrane was Ceremion CMV/AMV 11 pairs).

(g) The solution after having been subjected to treatment by means of this device was passed through a mixed bed-type, ion exchange resin column, and the final refining desalting operation was carried out.

As the ion exchange resin, a hydrogen-type, strongly acidic, cation exchange resin, such as amberlite IR–120B, and a hydroxyl radical-type, strongly basic, anion exchange resin, such as amberlite IRA–410, were used.

(h) The refined solution was subjected to vacuum concentration and the concentration was adjusted to Brix 89. Then about 10 g. of crystalline fructose were added thereto and, after slow stirring, it was slowly cooled. In about 15 hours crystallization was completed and the solution was subjected first to centrifugal separation, and then to vacuum drying. 1.95 kg. of crystalline fructose were obtained.

The amount of the fructose obtained signifies 45.20 kg. of fructose can be obtained from 100 kg. of refined white sugar.

What we claim is:

1. Method for separating fructose, which comprises providing a sugar solution containing fructose and glucose and having neutral or acidic pH; dissolving calcium chloride, in the absence of alcohol, into said sugar solution, the amount of calcium chloride being above 15 weight percent based on the total weight of the sugars contained in the sugar solution; condensing the thus obtained solution; slowly cooling the thus condensed solution while slowly stirring the same to form a fructose calcium chloride double salt; and separating the fructose from said double salt by electrodialysis.

2. Method according to claim 1, wherein in separating said fructose from said double salt, a water solution of said double salt is subjected to electrodialysis by charging said water solution to an apparatus provided with an ion exchange membrane for electrodialysis in which said sugar solution containing fructose and glucose is used as the condensing liquor.

3. Method according to claim 2, wherein glucose obtained from the separation of said fructose calcium chloride double salt, is reused as the said sugar solution.

4. Method according to claim 3, wherein said glucose is obtained from one of the following: contained in the residual solution obtained from fructose double salt separation; separated from said residual solution by isomerization.

5. Method according to claim 3, wherein said glucose is separated from the residual solution obtained from the separation of said fructose calcium chloride double salt, said residual solution being subjected to electrodialysis by charging the same into an apparatus provided with an ion exchange membrane for electrodialysis in which said sugar solution containing fructose and glucose is used as the condensing liquor, to separate said glucose.

6. Method according to claim 1, wherein the dissolving of calcium chloride into said sugar solution is effected in such a manner as to prevent a rise in temperature of the resulting mixture above about 70° F., the amount of $CaCl_2$ added being greater than about 15% by weight, based on the total weight of the sugar in solution.

References Cited

UNITED STATES PATENTS

| 2,860,091 | 11/1958 | Rosenberg | 204—180 X |
| 2,929,746 | 3/1960 | Assalini | 127—46 |
| 3,174,876 | 3/1965 | Stark | 127—46 |
| 3,383,245 | 5/1968 | Scallet et al. | 127—53 |
| 3,440,159 | 4/1969 | McCrae et al. | 204—180 |
| 3,472,750 | 10/1969 | Campbell et al. | 204—180 |
| 3,483,031 | 12/1969 | Lauer et al. | 127—46 X |
| 3,533,839 | 10/1970 | Hara et al. | 127—42 |

JOHN H. MACK, Primary Examiner

A. C. PRESCOTT, Assistant Examiner

U.S. Cl. X.R.

127—46